(12) United States Patent
Lelievre et al.

(10) Patent No.: US 11,762,476 B2
(45) Date of Patent: Sep. 19, 2023

(54) DEVICE AND METHOD FOR HAND-BASED USER INTERACTION IN VR AND AR ENVIRONMENTS

(71) Applicant: InterDigital CE Patent Holdings, SAS, Paris (FR)

(72) Inventors: Sylvain Lelievre, Montgermont (FR); Philippe Schmouker, Betton (FR); Jean-Eudes Marvie, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/761,056

(22) PCT Filed: Sep. 7, 2020

(86) PCT No.: PCT/EP2020/074950
§ 371 (c)(1),
(2) Date: Mar. 16, 2022

(87) PCT Pub. No.: WO2021/052800
PCT Pub. Date: Mar. 25, 2021

(65) Prior Publication Data
US 2022/0342485 A1    Oct. 27, 2022

(30) Foreign Application Priority Data

Sep. 20, 2019  (EP) .................................... 19306153

(51) Int. Cl.
*G06F 3/0481*    (2022.01)
*G06F 3/0482*    (2013.01)
(Continued)

(52) U.S. Cl.
CPC .............. *G06F 3/017* (2013.01); *G06F 3/011* (2013.01); *G06F 3/04817* (2013.01);
(Continued)

(58) Field of Classification Search
CPC ...... G06F 3/017; G06F 3/011; G06F 3/04817; G06F 3/04845; G06F 2203/04804; G06F 2203/04806; G06F 3/0482; G06F 3/04842
See application file for complete search history.

(56) References Cited

U.S. PATENT DOCUMENTS 5,568,603 A * 10/1996 Chen ................... G06F 3/04845
715/788
6,874,126 B1 * 3/2005 Lapidous .............. G06F 3/0481
715/764
(Continued)

FOREIGN PATENT DOCUMENTS

WO    WO 2018071004 A1    4/2018

OTHER PUBLICATIONS

Hingorani Mohit, "Gesture based Data Interaction using the Kinect", May 16, 2014, YouTube, https://www.youtube.com/watch?v=Ew29FzodkxE, 2 pages.
(Continued)

*Primary Examiner* — Jordany Nunez
(74) *Attorney, Agent, or Firm* — Volpe Koenig

(57) ABSTRACT

A virtual reality (VR) or augmented reality (AR) system detects through a camera when a user's hand positions match a predefined position and in response thereto renders an overlay including a crown with which the user can interact to lock onto an object or scene. The system then detects and renders a centre indicator of the crown, tracking the user's hands, enables or disables actions depending on the position of the centre indicator relative to a neutral zone, responds to user hand movement to implement actions, and also detects unlock of the object or scene.

17 Claims, 3 Drawing Sheets

(51) Int. Cl.
*G06F 3/01* (2006.01)
*G06F 3/04817* (2022.01)
*G06F 3/04845* (2022.01)

(52) U.S. Cl.
CPC .......... *G06F 3/04845* (2013.01); *G06F 2203/04804* (2013.01); *G06F 2203/04806* (2013.01)

(56) References Cited

U.S. PATENT DOCUMENTS

| | | | |
|---|---|---|---|
| 8,274,535 B2* | 9/2012 | Hildreth | G06T 7/74 345/157 |
| 9,122,311 B2 | 9/2015 | Galor | |
| 9,229,235 B2* | 1/2016 | Ballard | G02B 27/017 |
| 9,317,130 B2 | 4/2016 | Krepec | |
| 9,383,894 B2 | 7/2016 | Schwesinger et al. | |
| 9,460,314 B2* | 10/2016 | Ballard | G06F 1/163 |
| 9,529,513 B2 | 12/2016 | Balan et al. | |
| 9,582,091 B2 | 2/2017 | Kim et al. | |
| 9,727,211 B2* | 8/2017 | Ballard | H04N 23/635 |
| 9,829,989 B2 | 11/2017 | Mcgrath et al. | |
| 9,996,221 B2* | 6/2018 | Ballard | H04L 12/1822 |
| 10,254,846 B1* | 4/2019 | Kinstner | G06F 3/0487 |
| 10,254,920 B2* | 4/2019 | Reily | G06T 19/006 |
| 10,261,594 B2* | 4/2019 | Marcolina | G06T 19/006 |
| 10,466,858 B2* | 11/2019 | Ballard | H04L 12/1822 |
| 10,551,932 B2* | 2/2020 | Ito | G06F 3/011 |
| 10,558,325 B2* | 2/2020 | Athey | G06F 3/0346 |
| 10,692,237 B2* | 6/2020 | Sompura | G06T 7/62 |
| 10,852,913 B2* | 12/2020 | Yoganandan | G06F 3/0488 |
| 11,334,212 B2* | 5/2022 | Ravasz | G06V 40/20 |
| 11,475,661 B2* | 10/2022 | Carter | G06V 20/40 |
| 2003/0020755 A1* | 1/2003 | Lemelson | G06F 3/013 715/786 |
| 2003/0210227 A1* | 11/2003 | Smith | G06F 3/013 345/157 |
| 2008/0018595 A1* | 1/2008 | Hildreth | G06F 3/017 348/E13.016 |
| 2013/0055150 A1 | 2/2013 | Galor | |
| 2013/0103446 A1* | 4/2013 | Bragdon | G06F 3/0488 705/7.15 |
| 2013/0127825 A1* | 5/2013 | Joshi | G06F 3/04845 345/419 |
| 2013/0135353 A1* | 5/2013 | Wheeler | G06F 3/013 345/660 |
| 2013/0246967 A1* | 9/2013 | Wheeler | G06F 3/012 715/784 |
| 2014/0282274 A1* | 9/2014 | Everitt | G06F 3/0485 715/863 |
| 2015/0153571 A1* | 6/2015 | Ballard | H04N 23/61 345/8 |
| 2015/0153826 A1* | 6/2015 | Ballard | G06F 3/0346 345/633 |
| 2015/0153912 A1* | 6/2015 | Reily | G06F 3/04842 715/784 |
| 2015/0153913 A1* | 6/2015 | Ballard | H04N 23/51 715/810 |
| 2015/0153922 A1* | 6/2015 | Ballard | H04N 23/635 345/156 |
| 2015/0156028 A1* | 6/2015 | Ballard | G06F 3/04812 709/204 |
| 2015/0156803 A1* | 6/2015 | Ballard | H04W 76/10 455/422.1 |
| 2016/0011724 A1* | 1/2016 | Wheeler | G06F 3/013 715/810 |
| 2016/0091982 A1 | 3/2016 | Mongia et al. | |
| 2016/0098579 A1* | 4/2016 | Ballard | H04W 76/10 726/27 |
| 2016/0224123 A1* | 8/2016 | Antoniac | G06F 3/04815 |
| 2016/0274732 A1 | 9/2016 | Bang et al. | |
| 2016/0306431 A1 | 10/2016 | Stafford et al. | |
| 2016/0350971 A1* | 12/2016 | Athey | G06F 3/012 |
| 2017/0017361 A1* | 1/2017 | Ballard | A45C 11/00 |
| 2017/0097687 A1* | 4/2017 | Pinault | G06F 3/017 |
| 2017/0354883 A1* | 12/2017 | Benedetto | G06T 19/20 |
| 2018/0088677 A1 | 3/2018 | Zhang et al. | |
| 2018/0143693 A1* | 5/2018 | Calabrese | G06V 40/193 |
| 2018/0217672 A1* | 8/2018 | Ito | G02B 27/0172 |
| 2018/0284962 A1* | 10/2018 | Ballard | H04N 23/631 |
| 2019/0079589 A1* | 3/2019 | Spalla | G06F 3/0346 |
| 2019/0107896 A1* | 4/2019 | Stafford | G06F 3/017 |
| 2019/0371066 A1* | 12/2019 | Shiff | A63F 13/212 |
| 2021/0248371 A1* | 8/2021 | Carter | G06T 11/00 |
| 2022/0301231 A1* | 9/2022 | Eirinberg | G06F 3/011 |
| 2023/0038709 A1* | 2/2023 | Ramani | G06T 19/006 |
| 2023/0139977 A1* | 5/2023 | Carter | G06V 20/20 345/633 |

OTHER PUBLICATIONS

Anonymous, "Interaction Engine 1.0—Object Interactions, UI Toolkit, Handheld Controller Support and More", Leap Motion Blog, Jun. 7, 2017, URL: http://blog.leapmotion.com/interaction-engine/, 18 pages.

Blaga et al., "[POSTER] Usability Analysis of an Off-the-Shelf Hand Posture Estimation Sensor for Freehand Physical Interaction in Egocentric Mixed Reality", Instiute of Electronics and Electrical Engineers (IEEE), 2017 IEEE International Symposium on Mixed and Augmented Reality Adjunct Proceedings, Nantes, France, Oct. 9, 2017, 4 pages.

Majd Jordan, "Hand-tracked-natural-interaction-in-VR", Blue Penguin Blog, Apr. 24, 2017, URL: https://blog.bluepengu.in/hand-tracked-natural-interaction-in-vr-5e5ae43ca3ff, 6 pages.

* cited by examiner

DEVICE AND METHOD FOR HAND-BASED USER INTERACTION IN VR AND AR ENVIRONMENTS

CROSS REFERENCE TO RELATED APPLICATIONS

This application is a U.S. National Stage Application under 35 U.S.C. 371 of International Patent Application No. PCT/EP2020/074950, filed Sep. 7, 2020, which is incorporated herein by reference in its entirety.

This application claims the benefit of European Patent Application No. 19306153, filed Sep. 20, 2019, which is incorporated herein by reference in its entirety.

TECHNICAL FIELD

The present disclosure relates generally to user interfaces and in particular to a user interface for Virtual Reality (VR) and Augmented Reality (AR) environments.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

VR and AR technology provides an immersive experience to users running such applications on suitable displays such as smartTVs, PCs, projectors, head-mounted displays (HMDs), etc. Through a user interface, the user is typically able to interact with the VR or AR environment, for example to handle objects therein. To do this, it is necessary to receive user input, which for example can be done by user tracking systems using sensors (wearable or not) or cameras that detect color and depth. For instance, a connected smartTV equipped with a color/depth camera could be able to track the shape and the position of each element of the user's body, which could enable the use of hand gestures in a natural interaction system. This could give a user a way of interacting with a AR or VR scene or object in for example a broadcast TV program, a content item from the Internet or content shared during a video conference.

Conventional user interfaces can overlay images of the user's hands, which makes interaction with buttons and other menu items relatively straightforward. Interaction with objects is more difficult since the objects do not always react as in the real world.

Another conventional solution provides on the screen indications of the user's hand position and enable the user to interact with a virtual object to zoom in/out and rotate the object.

However, in particular when interacting with object, such user interfaces tend to be difficult to use, in particular for new users as they are not always intuitive.

It will thus be appreciated that there is a desire for a solution that addresses at least some of the shortcomings of user interfaces for AR and VR. The present principles provide such a solution.

SUMMARY OF DISCLOSURE

In a first aspect, the present principles are directed to a method in a device for rendering a virtual reality or augmented reality environment. The method comprises in at least one hardware processor of the device rendering an overlay on a display, calculating a position of a centre indicator of the overlay based on detected positions of a user's hands, enabling at least one action based on the position of the centre indicator relative to a neutral zone, and performing, in response to user hand movement, an enabled action.

In a second aspect, the present principles are directed to a device for rendering a virtual reality or augmented reality environment, the device comprising at least one hardware processor configured to render an overlay on a display, calculate a position of a centre indicator of the overlay based on positions of a user's hands, enable at least one action based on the position of the centre indicator relative to a neutral zone, and perform, in response to user hand movement, an enabled action.

In a third aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
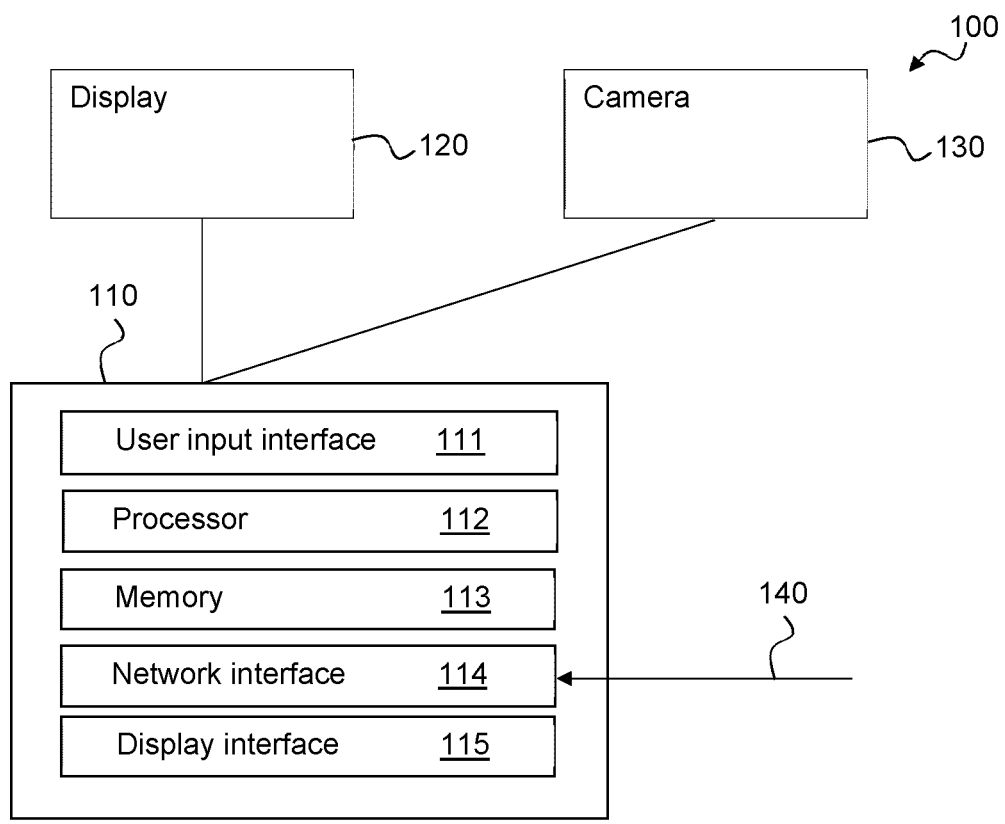
FIG. 1 illustrates a Virtual reality (VR)/augmented reality (AR) system according to an embodiment of the present principles.

FIG. 1 is a depiction of a virtual reality (VR) or augmented reality (AR) interactive system 100 in accordance with an illustrative embodiment. The interactive system 100 comprises a rendering device 110, a display 120 and a camera 130.

The rendering device 110, the display 120 and the camera 130 have been depicted as separate entities, but in different variants, they are combined in every possible way. For example the three entities can be incorporated into a single device such as a television, the display 120 and the rendering device 110 to be together while the camera 130 is separate, or for the rendering device 110 to be separate from a display including a camera.

The display 120 is operative to display to a user (not shown) video received from the rendering device. The display 120 can for example be a television, a computer screen, a head-mounted display (HMD), a tablet or a smartphone.

The camera 130, which can be a depth and colour camera, is operative to capture images and/or video of whatever is in front of its aperture. In interactive system 100, the camera 130 will typically be arranged to capture an environment including the user. Other gesture detectors detecting positions of a user's hands are also possible, such as one or more sensors worn by the user.

The rendering device 110 can for example be a computer, a set-top box, a gaming console, a tablet, a smartphone or the like. The rendering device 110 typically includes a user input interface 111, at least one hardware processor ("processor") 112, memory 113, a network interface 114 and an output interface, for example a display interface 115 or a speaker. The interfaces are at least partly implemented in hardware. It will be appreciated that parts of the device 110 that are not useful for understanding the present principles are not illustrated for the sake of brevity of description.

The user input interface 111 can be wireless and configured to receive input from an input device (not shown), but it can also be a touch screen, an interface to a keyboard and/or a mouse, and the like. The user input interface is configured to provide received input to the processor 112. The processor 112 is configured to execute program code instructions to perform a method according to the present principles described with reference to FIG. 2. The memory 113 is configured to store the program code instructions for execution by the processor 112 and to store data. The network interface 114 can be wired or wireless and is configured to allow communication between the processor 112, via connection 140, and at least one device such as a server in an external network (not shown) to receive computer programs or content for display to a user. Such content may be video programs, which will be used as a non-limitative example. The output interface can be wired or wireless and configured to output content for display on the display 120. As already mentioned, in case the device 110 is a television, the display 120 is typically included in the device. It will be noted that a television may also have a display interface for displaying information on a separate screen (not shown).

A salient aspect of the present principles is the use of an overlay on top of the VR/AR scene.

Figure 2:
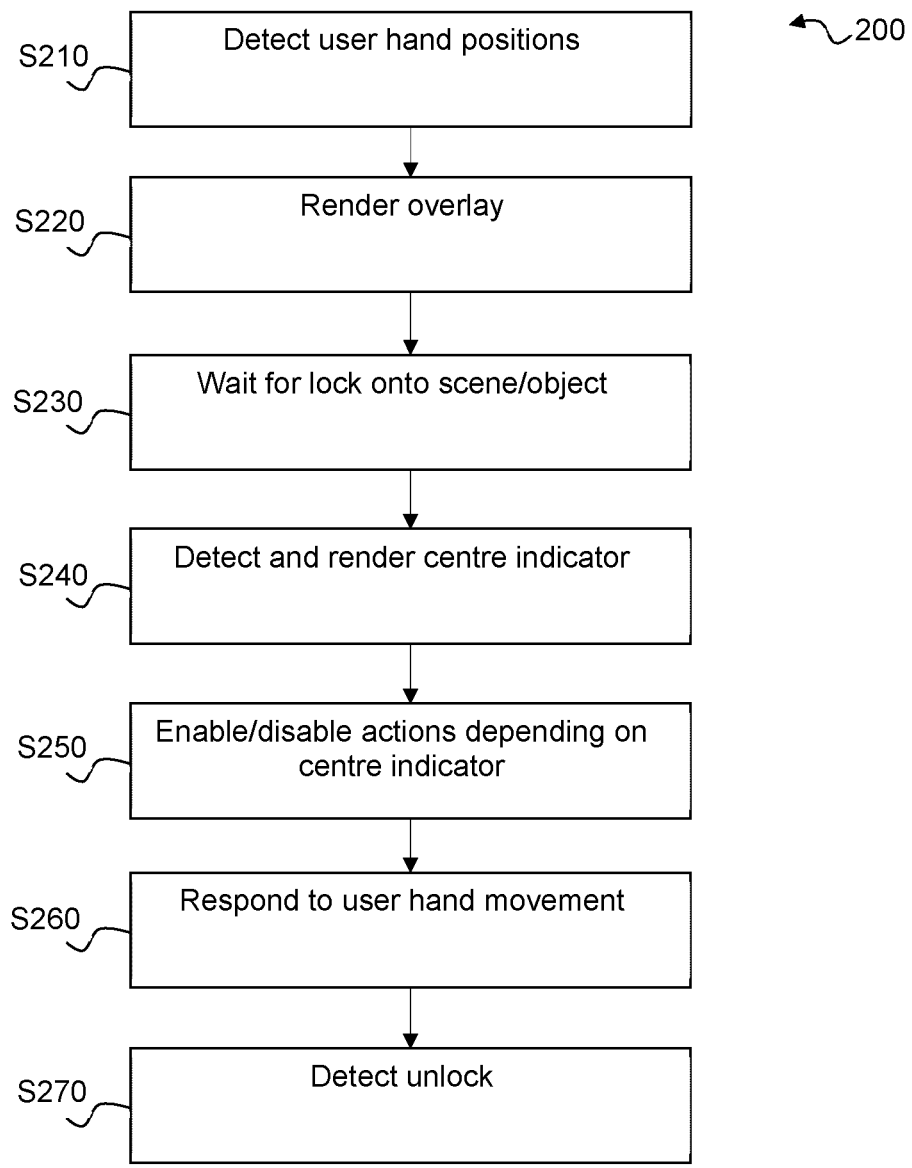
FIG. 2 illustrates a method according to an embodiment of the present principles.

FIG. 2 illustrates a method according to an embodiment of the present principles. It is assumed that the user is "inside" the AR/VR scene, i.e. that the user is able to interact with the scene. For exemplary purposes, it is also assumed that the user has not interacted with any object in the scene.

In step S210 the user interface (120 in FIGS. 1 and 2) of the interactive system (100 in FIG. 1) detects the position of the user's hands to detect when the position matches a predefined position. The predefined position can be one out of a plurality of positions having the same meaning. An example of such a predefined position can be when the user extends the hands in front of the body.

Figure 3:
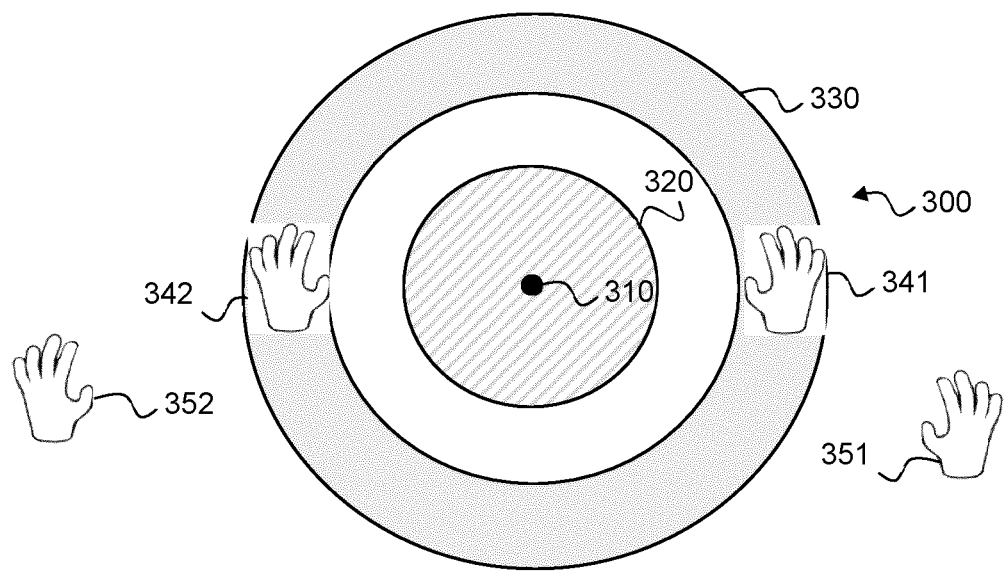
FIG. 3 illustrates a first example of such an overlay according to the present principles.

Upon detection of a match, the user interface renders, in step S220, a overlay on the AR/VR scene. FIG. 3 illustrates a first example of such an overlay 300 according to the present principles. The overlay 300, which can be at least partly semi-transparent, is in the example intended to be interacted with using two hands.

The overlay 300 can include a centre indicator 310, a neutral zone 320 (diagonally hatched in grey) and a crown 330 that includes a first and a second lock position 341, 342.

The centre indicator 310 indicates the centre of the crown 330. When the centre indicator 310 is located inside the neutral zone 320, certain user actions are inhibited, as will be described. Conversely, actions can be enabled only when the centre indicator 310 is located inside the neutral zone 320. The neutral zone 320 can be invisible (or more transparent) when the centre indicator 310 is located inside, and made visible or less transparent when the centre indicator 310 is outside.

The lock positions 341, 342, preferably hand-shaped, indicate where the user has to put its hands to lock or unlock a scene or object, as will be described.

The positions of the user's hands are represented by a right hand indicator 351 and a left hand indicator 352, illustrated in exemplary positions.

In step S230, the user interface waits for the user to lock on to an object by a specific hand gesture, which in the present example is putting the hands over (or at least essentially over) the lock positions 341, 342 for a given period of time; in other words, to place the hand indicators 351, 352 on top of the lock positions 341, 342 for a given period of time, which can be 0.5 seconds, 1 second, 1.5 seconds and so on.

In an embodiment, the lock positions 341, 342 blinks when there is no lock. In addition, the user interface can render text to inform the user how to lock on to an object.

Upon lock on to the object, the user interface detects and renders, preferably essentially continuously, in step S240, the position of the centre indicator 310. In particular, the user interface can detect whether the centre indicator 310 lies inside or outside the neutral zone 320. When locked, the centre indicator 310 typically corresponds, possibly with some lag, to the centre of the user's two hands, i.e. the centre of the hand indicators 351, 352. It is noted that the crown 330 typically follows the movement of the centre indicator 310.

Figure 4:
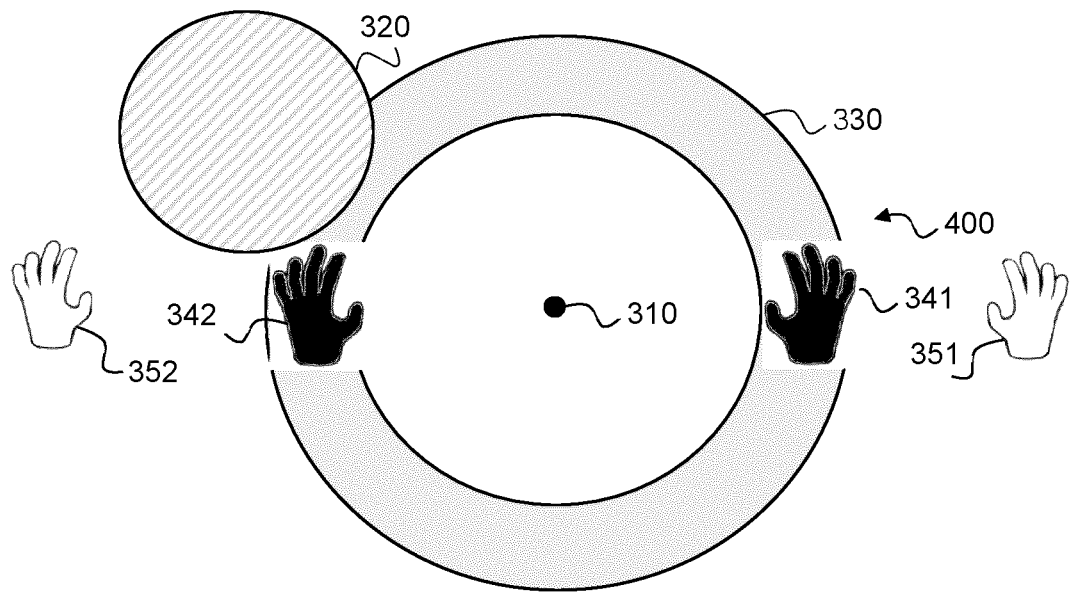
FIG. 4 illustrates a second example of such an overlay according to the present principles.

FIG. 4 illustrates a second example of an overlay 400 according to the present principles. The components of the overlay 400 are the same as those illustrated in the overlay 300 in FIG. 3, the differences being that the lock positions 341, 342 have been filled to indicate lock on to the object or scene, and that the centre indicator 310 and the crown 330 have followed the user's hands so that the centre indicator 310 is now outside of the neutral zone 320 (it is noted that it in the Figure appears as if the neutral zone has moved).

In step S250, the user interface enables and/or disables user actions depending on the position of the centre indicator 310 relative to the neutral zone 320.

For example, when inside, enabled user actions can include:
  zoom in or out (i.e. bring an object closer or farther away) by respectively spreading or nearing the hands (possibly limited to when the hand indicators 351, 352 are at essentially the same height), and
  rotating the object through a corresponding circular movement of the hands (as if they were on a steering wheel), possibly limited to when the hand indicators 351, 352 are inside the crown 330; and
when outside, enabled user actions can include:
  rotating an object horizontally by moving the hands in a corresponding horizontal direction, or vertically by moving the hands in a corresponding vertical direction, or
  moving the camera (i.e. user's viewpoint) around in the scene.

As will be appreciated, the neutral zone can make the AR/VR scene less prone to for example accidental rotations since small horizontal or vertical hand movements will have no effect while the centre indicator 310 is in the neutral zone 320.

The user interface can indicate the possibilities by for example rendering icons indicative of enabled actions. Additionally, icons can be rendered in a different aspect (for example greyed or faded) for disabled actions, as is conventional in user interfaces. The icons can be rendered for a limited time period before disappearing or fading away.

Preferably, the icons are rendered in a peripheral area so as not to hide much of the scene or object.

It is noted that other user actions, such as moving an object, can be implemented by the user interface.

In step S260, the user interface responds to user actions tracked through hand position detection. The user actions can include the ones described with reference to step S250. Further actions can include unlocking (to be described with reference to step S270), and hiding and displaying the overlay 300 when the user crosses the hands, i.e. brings the right hand to the left of the left hand (and it is noted that this can be disabled when the user performs a rotation through circular movement of the hands, so as to enable great circular rotation, e.g. 180°. Alternatively, the hand indicators 351, 352 can be prevented from switching sides so that the left is always to the left of or at the same vertical position as the right (except, for example, when performing a circular movement).

It is noted that horizontal or vertical rotation of an object can be temporarily disabled as the centre indicator 310 passes through the neutral zone 320 on its way to the other side.

In step S270, the user interface detects unlock of the object or scene. This can be done by the user putting the hand indicators 351, 352 on top of the lock positions 341, 342 for a given time. As can be seen, the user can do the same as for locking on to the object or scene. The unlock may also require that the center indicator 310 is in the neutral zone 320.

In a variant suitable for one-hand use, the overlay can include a single lock position over which the user should put a hand indicator for a given time in order to lock the scene or object, while unlocking is done the same way. In the variant, enabled user actions can be limited to moving an object.

It will thus be appreciated that the present principles can be used to provide a AR/VR system that provides a user with information on enabled user actions and also, through the use of the neutral zone, to provide an AR/VR experience that is less subject to 'jitter' caused by small hand movements.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method in a device for rendering a virtual reality or augmented reality environment, the method comprising in at least one hardware processor of the device:
  rendering an overlay on a display, wherein the overlay comprises a center indicator, a neutral zone, a crown with first and second lock positions, and right and left hand indicators, the first and second lock positions indicating where the user should superpose the right and left hand indicators to lock onto an object or a scene, or to unlock a locked onto object or scene; and
  enabling at least one user action of a plurality of user actions based on whether a position of the center indicator of the overlay lies inside or outside the neutral zone of the overlay, the position of the center indicator calculated as a center of detected positions of a user's hands.

2. The method of claim 1, further comprising rendering the overlay in response to detection of a match between detected hand positions and at least one predefined position.

3. The method of claim 1, wherein the overlay is at least partly semi-transparent.

4. The method of claim 1, wherein a first set of actions is enabled only when the position of the center indicator lies inside the neutral zone, and wherein a second set of actions is enabled only when the position of the center indicator lies outside the neutral zone.

5. The method of claim 4, wherein the first action is one of zoom in, zoom out and rotation in a plane of the display, and the second action is one of horizontal rotation, vertical rotation, and movement.

6. The method of claim 1, further comprising rendering first icons, having a first visual aspect, indicative of enabled actions, and second icons, having a second visual aspect, for disabled actions.

7. A device for rendering a virtual reality or augmented reality environment, the device comprising at least one hardware processor configured to:
   render an overlay on a display, wherein the overlay comprises a center indicator, a neutral zone, a crown with first and second lock positions, and right and left hand indicators, the first and second lock positions indicating where the user should superpose the right and left hand indicators to lock onto an object or a scene, or to unlock a locked onto object or scene; and
   enable at least one user action of a plurality of user actions based on whether a position of the center indicator of the overlay lies inside or outside the neutral zone of the overlay, the position of the center indicator calculated as a center of detected positions of a user's hands.

8. The device of claim 7, wherein the at least one hardware processor is further configured to render the overlay in response to detection of a match between detected hand positions and at least one predefined position.

9. The device of claim 7, wherein the at least one hardware processor is configured to enable a first action only when the position of the center indicator lies inside the neutral zone and to enable a second action only when the position of the center indicator lies outside the neutral zone.

10. The device of claim 9, wherein the first action is one of zoom in, zoom out and rotation in a plane of the display, and the second action is one of horizontal rotation, vertical rotation, and movement.

11. The device of claim 7, wherein the at least one hardware processor is further configured to render first icons, having a first visual aspect, indicative of enabled actions, and second icons, having a second visual aspect, for disabled actions.

12. The device of claim 7, wherein the device comprises at least one of the display and a camera configured to capture the positions of the user's hands.

13. A non-transitory computer readable medium storing program code instructions that, when executed by a processor, implement the steps of a method according to claim 1.

14. The method of claim 1, further comprising performing, in response to detected user hand movement, an enabled user action.

15. The device of claim 7, wherein the at least one hardware processor is further configured to calculate the position of the center indicator based on detected positions of a user's hands.

16. The device of claim 7, wherein the at least one hardware processor is further configured to perform an enabled user action in response to detected user hand movement.

17. The method of claim 1, further comprising calculating the position of the center indicator of the overlay based on the detected positions of the user's hands.

* * * * *